US008209267B2

(12) United States Patent
Poulin

(10) Patent No.: US 8,209,267 B2
(45) Date of Patent: *Jun. 26, 2012

(54) AUTOMATIC REVENUE PROTECTION AND ADJUSTMENT OF POSTAL INDICIA PRODUCTS

(75) Inventor: Jeffrey S. Poulin, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 951 days.

This patent is subject to a terminal disclaimer.

(21) Appl. No.: 11/006,725

(22) Filed: Dec. 8, 2004

(65) Prior Publication Data

US 2006/0122947 A1 Jun. 8, 2006

(51) Int. Cl.
*G06F 17/00* (2006.01)
*G06Q 10/00* (2006.01)

(52) U.S. Cl. .......................................... 705/401; 705/1.1

(58) Field of Classification Search ............... 705/1, 1.1, 705/401
See application file for complete search history.

(56) References Cited

U.S. PATENT DOCUMENTS 3,701,165 A 10/1972 Huddleston
3,839,637 A 10/1974 Willis
3,942,154 A 3/1976 Akami et al.
3,991,706 A 11/1976 Pearl
4,150,781 A 4/1979 Silverman et al.
4,397,142 A 8/1983 Bingham
4,527,383 A 7/1985 Bingham
4,623,579 A 11/1986 Quon
4,637,051 A 1/1987 Clark
4,660,221 A 4/1987 Dlugos
4,743,747 A 5/1988 Fougere et al.
4,767,205 A 8/1988 Schwartz et al.
4,775,246 A 10/1988 Edelmann et al.
4,864,618 A 9/1989 Wright et al.
4,934,846 A 6/1990 Gilham
4,972,475 A 11/1990 Sant'Anselmo
4,982,437 A 1/1991 Loriot
5,036,610 A 8/1991 Fehr
5,075,862 A 12/1991 Doeberl et al.
5,142,482 A 8/1992 Sansone
5,142,577 A 8/1992 Pastor
5,227,617 A 7/1993 Christopher et al.
5,283,422 A 2/1994 Storch et al.
(Continued)

FOREIGN PATENT DOCUMENTS

CA 2152835 1/1996
(Continued)

OTHER PUBLICATIONS

USPS.com, Aug. 1, 2003.*
(Continued)

*Primary Examiner* — Candice D Carter
(74) *Attorney, Agent, or Firm* — Miles & Stockbridge P.C.

(57) ABSTRACT

A method for performing automatic account adjustment including performing automatic account adjustment processing on an account associated with a source of a unique postal indicium, if scanned information about the unique postal indicium indicates an incorrect tariff associated with a mail piece to which the unique postal indicium is affixed. The method may also include outputting information to report results of the automatic account adjustment processing, if scanned information about the unique postal indicium indicates an incorrect tariff associated with a mail piece to which the unique postal indicium is affixed.

15 Claims, 8 Drawing Sheets

U.S. PATENT DOCUMENTS

| | | | | |
|---|---|---|---|---|
| 5,285,382 | A | 2/1994 | Muehlberger et al. | |
| 5,289,547 | A | 2/1994 | Ligas et al. | |
| 5,319,562 | A | 6/1994 | Whitehouse | |
| 5,337,361 | A | 8/1994 | Wang et al. | |
| 5,375,172 | A | 12/1994 | Chrosny | |
| 5,390,251 | A | 2/1995 | Pastor et al. | |
| 5,498,034 | A | 3/1996 | Ford | |
| 5,555,497 | A | 9/1996 | Helbling | |
| 5,586,036 | A | 12/1996 | Pintsov | |
| 592,561 | A | 1/1997 | Moore | |
| 5,666,421 | A | 9/1997 | Pastor et al. | |
| 5,675,650 | A | 10/1997 | Cordery et al. | |
| 5,786,219 | A | 7/1998 | Zhang et al. | |
| 5,798,834 | A | 8/1998 | Brooker | |
| 5,822,739 | A | 10/1998 | Kara | |
| 5,895,073 | A | 4/1999 | Moore | |
| 5,917,925 | A | 6/1999 | Moore | |
| 5,974,147 | A | 10/1999 | Cordery et al. | |
| 6,005,945 | A | 12/1999 | Whitehouse | |
| 6,039,257 | A | 3/2000 | Berson et al. | |
| 6,064,995 | A | 5/2000 | Sansone et al. | |
| 6,085,182 | A | 7/2000 | Cordery | |
| 6,249,777 | B1 | 6/2001 | Kara et al. | |
| 6,381,589 | B1 | 4/2002 | Leon | |
| 6,385,504 | B1 | 5/2002 | Pintsov et al. | |
| 6,438,530 | B1 | 8/2002 | Heiden et al. | |
| 6,505,179 | B1 | 1/2003 | Kara | |
| 6,527,178 | B1 | 3/2003 | Gordon et al. | |
| 6,701,304 | B2 | 3/2004 | Leon | |
| 6,779,727 | B2 | 8/2004 | Warther | |
| 6,816,844 | B2 | 11/2004 | Leon | |
| 6,834,273 | B1 * | 12/2004 | Sansone et al. | 705/410 |
| 6,889,214 | B1 | 5/2005 | Pagel et al. | |
| 7,210,617 | B2 | 5/2007 | Chaum | |
| 2001/0042052 | A1 | 11/2001 | Leon | |
| 2002/0026430 | A1 | 2/2002 | Ryan, Jr. | |
| 2002/0096560 | A1 | 7/2002 | Page | |
| 2002/0120668 | A1 | 8/2002 | Leon | |
| 2003/0062411 | A1 | 4/2003 | Chung et al. | |
| 2003/0089765 | A1 * | 5/2003 | Kovlakas | 235/375 |
| 2003/0101148 | A1 | 5/2003 | Montgomery et al. | |
| 2003/0155703 | A1 | 8/2003 | Zimmermann | |
| 2003/0182238 | A1 | 9/2003 | Brookner et al. | |
| 2003/0219145 | A1 | 11/2003 | Smith | |
| 2003/0225711 | A1 | 12/2003 | Paping | |
| 2003/0232571 | A1 | 12/2003 | Weinerth | |
| 2004/0059680 | A1 | 3/2004 | Lang et al. | |
| 2004/0078346 | A1 * | 4/2004 | Amonette et al. | 705/407 |
| 2004/0083189 | A1 | 4/2004 | Leon | |
| 2004/0093312 | A1 * | 5/2004 | Cordery et al. | 705/401 |
| 2004/0122779 | A1 * | 6/2004 | Stickler et al. | 705/402 |
| 2004/0128190 | A1 | 7/2004 | Campo et al. | |
| 2004/0128254 | A1 | 7/2004 | Pintsov | |
| 2005/0039092 | A1 | 2/2005 | Soule et al. | |
| 2005/0131840 | A1 * | 6/2005 | Pintsov et al. | 705/401 |
| 2005/0256811 | A1 | 11/2005 | Pagel et al. | |
| 2009/0089254 | A1 | 4/2009 | Von Kaenel et al. | |

FOREIGN PATENT DOCUMENTS

| | | | |
|---|---|---|---|
| DE | 19812903 | A1 | 3/1998 |
| EP | 0328320 | A1 | 8/1989 |
| EP | 0663652 | A2 | 7/1995 |
| EP | 0710930 | A2 | 5/1996 |
| EP | 0741374 | A2 | 5/1996 |
| EP | 0931297 | | 7/1999 |
| EP | 0952558 | A2 | 10/1999 |
| EP | 1035515 | A2 | 9/2000 |
| EP | 1310917 | A2 | 5/2003 |
| FR | 2708432 | A1 | 2/1995 |
| GB | 2271452 | A | 4/1994 |
| WO | WO 88/01818 | A1 | 3/1988 |
| WO | WO 9721203 | | 6/1997 |
| WO | WO 98/14907 | | 4/1998 |
| WO | WO 9966456 | | 12/1999 |
| WO | WO 0129781 | | 4/2001 |
| WO | WO 01/43053 | A2 | 6/2001 |
| WO | WO 02/069103 | A2 | 9/2002 |
| WO | WO 2004/012053 | A2 | 2/2004 |
| WO | WO 2004/029754 | A2 | 4/2004 |

OTHER PUBLICATIONS

GFT: Indicia Server, API Specification, Revision 1.2, Feb. 12, 2003, 41 pages.
International Preliminary Report on Patentability and Written Opinion dated Jun. 21, 2007.
U.S. Appl. No. 11/006,726, filed Dec. 8, 2004, Poulin.
U.S. Appl. No. 11/176,256, filed Jul. 8, 2005, Poulin.
U.S. Appl. No. 11/006,736, filed Dec. 8, 2004, Poulin.
Jimenez, Luis A., "The Mail in 2010", World Mail & Express Conference, London, May 15-17, 2001.
Office Action dated Nov. 20, 2007 in U.S. Appl. No. 11/176,256.
Office Action dated Jul. 10, 2008, in U.S. Appl. No. 11/006,726.
Final Office Action dated May 12, 2010, in U.S. Appl. No. 11/006,736.
Australian Office Action dated Jul. 15, 2010, in Australian Patent Application No. 2005314482.
Australian Office Action dated Jul. 15, 2010, in Australian Patent Application No. 2005324481.
Australian Office Action dated Jul. 1, 2010, in Australian Patent Application No. 2005314480.
Office Action dated Sep. 8, 2008, in U.S. Appl. No. 11/006,736.

* cited by examiner

AUTOMATIC REVENUE PROTECTION AND ADJUSTMENT OF POSTAL INDICIA PRODUCTS

The present invention relates generally to automatic postage systems and the like. In one embodiment, an online postage system may verify unique postal indicia on mail pieces and automatically perform account adjustment processing to adjust rates, fees and penalties related to the postal indicia.

BRIEF DESCRIPTION OF THE DRAWINGS

The present invention will be described with reference to the accompanying drawings.

DETAILED DESCRIPTION

Figure 1A:
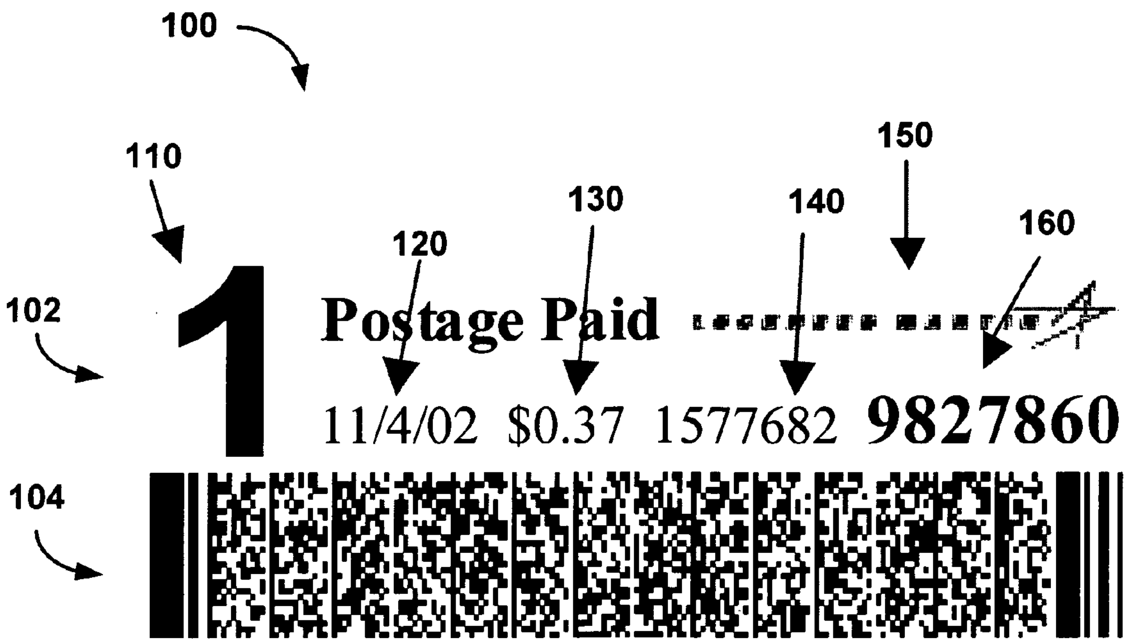
FIG. 1A is an example of a postal indicium containing both barcoded and human-readable information that may be used in accordance with embodiments of the present invention.

In accordance with an embodiment of the present invention, a system and method for an online postage system that may authorize the printing of an as needed postal indicium (e.g., an on-line postage stamp), receive and/or store data on the postal indicium, and verify that the postal indicium actually appearing on a mail piece is what a mailer of the mail piece claims was applied to the mail piece, is not a duplicate, or is not otherwise suspect fraudulent, as will be described herein, is provided. Specifically, the system and method may verify whether the information actually printed in the indicium appearing on the mail piece is correct, accurate, unaltered, not a duplicate, and/or is not otherwise suspected of being a fraudulent postal indicium; and, if necessary, send information for automatic revenue protection processing to make adjustments to a balance in an account associated with the mailer in real-time. "Real-time" as used herein applies to the general time frame associated with the initial processing of a mail piece in a first mail processing facility in which it is received. This processing may include the mail piece being scanned by a mail imaging/sorting system, moving the mail piece along the sorting part of the system, and discharging the mail piece into a sorted location based on the destination, all of which may take from approximately 3 to 14 seconds. However, if a confirmation that the indicium is valid is not received before being discharged into the sorted location, the mail piece may be shunted off to a "re-sorting" location from which a mail facility employee may physically take the mail piece and return it to a mail sorting system to be run through again. The mail sorting system at the re-sorting location may be different that the mail imaging/sorting system and may not be capable of taking an image of the mail piece, or it may be the same imaging/sorting system configured to recognize that the mail piece has already been imaged and re-sort the mail piece without taking another image of the mail piece. The re-sorting may take place within 1, 5, 10 or more minutes from being shunted off to the re-sorting location. Alternatively, the mail piece may be sent on to the sorted destination location even without the indicium being validated for later revenue protection processing. Throughout the sorting process, the mail piece may be tracked using methods, such as applying information to the mail piece, as is well known in the art. Therefore, the scanning and verification of the indicium, as well as the notification back to the mail imaging/sorting system, in general, occurs in real-time if all are completed before the mail piece is sent to the sorted destination location by the mail imaging/sorting system.

In accordance with an embodiment of the present invention, verifying that the information on the mail piece is correct, accurate, unaltered, not a duplicate, and/or otherwise suspect fraudulent may be performed in a system with an infrastructure designed to provide a "closed-loop" of information flow between the source of the indicium; one or more points of automation ("POA"), which may provide a centralized source and control for authorizing the printing of postal indicia, and, for example, may be located at a Postal Service facility, at a mailer's facility, or at a third party facility; and a mail processing facility. While more than one POA may be used, for ease of illustration and explanation only one POA may be described herein, it should be clearly understood that the embodiments described also may include more than one POA. A closed-loop of information may be formed by making the information that the source of the indicium (i.e., the mailer) claims to have printed in the indicium available to the POA that authorized the printing and a revenue protection system. So in other words, the closed-loop exists between the source of the indicium and the POA, for example, in response to an authorization to print a postal indicium (e.g., a "stamp") sent from the POA, the source of the postal indicium may, optionally, send a message back to the point of automation with data on what was actually printed in the postal indicium, depending on how the system may be implemented. For example, if the POA sends an authorization to print a $0.37 postal indicium, the authorization is received, and the source of the indicium (e.g., the mailer) actually prints a $0.37 postal indicium, the message sent back to the point of automation may include that data.

For example, the closed-loop of information may include the source of the indicium sending data on the indicium that is actually printed to the POA to be stored; the mail processing facility receiving a mail piece with the indicium affixed from the source of the indicium, scanning the indicium on the mail piece, and sending information scanned from the indicium to the POA for verification of the indicium; and the POA sending instructions to the mail processing facility on how to continue processing the mail piece. The closed-loop may also include revenue protection information flowing to a point, for example, a reporting system, which may result in revenue protection actions such as adjustments to the mailer's account, fines or other penalties.

In accordance with another embodiment of the present invention, the verification and adjustment of payment for a mail piece may take place in a networked infrastructure. For example, the networked infrastructure may provide a means to automatically settle with an identified source of an indicium (e.g., as represented by a mailer/source identification and/or permit identification, return address, or similar indication of a similar indication of the mailer as read from the mail piece) according to the amount of the credits/debits calculated for the mail piece to which the indicium is affixed. The calculated tariff may be based on mail piece type, dimensions, weight, requested class of service, and/or special handling instructions (i.e., express delivery, signed for delivery), for example. The amount of credit/debit may be made in real-time or at a convenient periodic interval, for example, one or more predetermined or variable times a day; during quiet periods (i.e., lulls) in processing of other indicium/mail piece information; and or whenever processing cycle times are available using, for example, cycle stealing techniques.

In accordance with yet another embodiment of the present invention, a minimal infrastructure that provides a means to record the identity of an identified source/mailer (e.g., as represented by a mailer/source identification and/or permit identification, return address, or similar indication of a similar indication of the mailer as read from the mail piece) and to tally the amount of the credits/debits calculated for the mail piece to which the indicium is affixed. The amount of credit/debit may be made at a convenient periodic interval by posting an invoice to the source/mailer using either automatic (e.g., using a system and/or software) or manual means (e.g., by personnel). For example, the periodic interval may include, but is not limited to, monthly, bi-weekly, weekly, daily, and/or an hourly or shorter interval. In general, the periodic interval can vary for each source/mailer as a function of the amount of postal indicia each source/mailer generates and mails.

Although the information in the indicium to be verified may appear in several forms, for example, a meter mark, a permit mark, a PC-postage indicium, a human-readable mark, and/or a barcode, reading the information from the indicium with automated equipment is simplified when the indicium is presented at least in the form of a barcode. For example, the barcode may be printed both with and without human-readable information, and any human-readable information printed with the barcode may also be coded in the barcode. Regardless, the entire indicium may be read (e.g., a bit-mapped image of the human-readable portion may be made and the image may be converted to actual digital character values; and the barcode may be scanned and the pattern converted to represent digital character values of information encoded in the barcode). To convert the bit-mapped image to actual digital character values may require an optical character recognition ("OCR") program be run that may determine the value of each character of the human-readable portion and save it as such. In general, the entire indicium may be read (e.g., scanned) at the mail processing facility in the single scan of a mail piece on which the indicium is affixed, scanned, and deciphered and the deciphered indicium information sent to the POA for verification that the indicium is correct, accurate, unaltered, and not a duplicate. Alternatively, the scanned indicium information may be sent directly to the POA without being deciphered. In yet another alternative, the scanned indicium information may be deciphered and verified locally at the mail processing facility using locally stored data on the indicium and the POA may be subsequently updated with the information and results of the verification. Alternatively, the entire indicium may be read at the mail processing facility in the single scan of a mail piece on which the indicium is affixed, scanned, and deciphered and the deciphered indicium information sent to the POA for verification that the indicium is correct, accurate, unaltered, and not a duplicate using data on the indicium received from another POA that authorized the printing of the indicium.

Revenue protection features may include validation of the data contained in the barcode to ensure that it was read properly, not falsified, and matches the services that were requested and purchased at the time of printing. In addition, the system can calculate a required tariff for the mail piece and/or ensure that a minimum tariff for the mail piece is paid using a tariff table. For example, if the indicium contains the amount paid, but does not contain data on the class of service, the class of service may be calculated using the amount paid, the type of the mail piece, and a tariff table in which a tariff (e.g., a rate) for each class of service for each type of mail piece is listed. The revenue protection features may also include verifying a "post-by" date of the indicium to ensure that the indicium was used within a pre-determined time of it being printed, and verifying that the indicium was only used once to prevent against the unauthorized duplication of the indicium.

In general, the revenue protection features are implemented in a closed-loop system, for example, a post-by date on the indicium may be statically enforced so that the indicium must be used by a certain date or else it expires. In a closed-loop system, post-by dates may be dynamic and have any desired expiration rules applied in real time. Likewise, for mail pieces with a unique identifier, the identifier may be used to electronically "cancel" the indicium in the stored data at the point of automation once the indicium is scanned in the mail system, for example, at a mail processing facility. As a result, any duplicate occurrences of the canceled indicium may be considered as a possibly fraudulent indicium. Similarly, mail pieces with digital validations such as embedded signatures, encrypted codes, etc. the validation marks also may be authenticated in real-time.

Specific service information, for example, mail class, mail value, or special services information such as signed-for delivery, return-receipt requested, etc., may be verified against what was actually sold (i.e., authorized) by the POA. For example, if a mail piece is labeled as "First Class," but the payment made by the mailer for the mail piece is insufficient for that class of service, the mail piece may be identified as possibly being fraudulent. In addition, once the indicium on the mail piece has been verified, the mailer's account may be automatically audited to compare the mailer's records against specific mail pieces or collections of mail pieces, as they are detected. Likewise, data collected through the revenue protection process may be used for informational reports, such as, breakdowns of the mail streams by type, date, point of mailing, class of service, etc.

In accordance with other embodiments of the present invention, the system and method may be used with postal indicia that are printed by third-party systems. In general, in the these embodiments a separate POA in the third-party system may be considered to be the source of the indicium, since the data necessary to verify any third-party system postal indicia will be sent from the separate POA to the POA of the present invention. Upon receipt of the data from the separate POA, the information loop between the POA and the source of the indicium is closed.

FIG. 1A is an example of a postal indicium containing both barcoded and human-readable information that may be used in accordance with embodiments of the present invention. The postal indicium, which is essentially a customer printed postage paid label or stamp, may be printed locally by customers who have the appropriate hardware, software and an established account with a postal service. As such, postal indicium, postal indicia, indicium, indicia, stamp(s), and/or postage paid label(s) are used herein somewhat interchangeably and should be understood to individually and collectively represent one or more appropriately formatted indications of postage paid that may be used with the various embodiments of the system described herein. In FIG. 1A, a postal indicium 100 may include a human-readable portion 102 and a barcode portion 104. Human-readable portion 102 may include a class of service indicator 110, which in FIG. 1A is a "1" to indicate First Class postage; a date of printing 120 to indicate on which date the indicium was printed; a tariff paid indication 130, which is shown as "$0.37", and is the current cost for first class postage for a letter up to one ounce in weight; an optional user number 140, for example, "1577682" to indicate the source of the indicium; a changeable customer branding symbol 150 to indicate the provider of the indicia printing system, the source that actually printed the indicium, and/or any other changeable graphic, such as a customer branding symbol; and an item number 160, for example, "9827860" to indicate a unique identifier associated with the indicium. Barcode portion 104 may be encoded with some or all of the human-readable information as well as additional information. For example, barcode portion 104 may also include a digital signature, a post-by date, and a postcode (for example, an un-validated or validated delivery point code ("DPC"), e.g., a ZIP code, ZIP+4, ZIP+4+2, and/or other value of an addressee) of the mail piece to which postal indicium 100 may be affixed.

In general, postal indicium 100 of FIG. 1A may include several versions, for example, a mail piece independent indicium and a mail piece dependent indicium. Mail piece independent indicia are indicia that would be printed without a postcode, that is, without a DPC for a specific addressee. As such, a mail piece independent indicium may be put on any mail piece, which means that the customer may pre-print a sheet having one or multiple indicia and apply them to any mail piece or pre-print one or more blank envelopes and/or cards. For example, customer system 220 may print out a sheet of 20, 30, or more $0.37 First Class Postage indicia, $0.23 Postcard indicia, etc., depending on the size of the sheet and the indicia being printed. As such, the bar-coded information on each indicium would include the individual serial number assigned to that indicium; the value of the indicium, e.g., the price or tariff paid; the class of postage, etc. However, since address-independent indicium will not contain the postcode of the destination address of the envelope on which they are printed or placed, the mail system will have to determine the postcode from the scanned destination address block ("DAB") information from the mail piece.

Mail piece dependent indicia are indicia that would be printed with a postcode, e.g., a DPC for the destination of the mail piece to which the indicium is to be affixed. In general, rather than being printed on a separate label, mail piece dependent indicia may be printed directly onto the envelopes with which they are associated. This may help to avoid placing a mail piece dependent indicium printed on a label on the wrong envelope, which should result in the indicium being identified as being invalid and the mail piece being removed from the mail system. In addition, at the same time that the customer prints the indicium on the envelope the DAB may also be printed on the front of the envelope with, for example, a DPC barcode such as a POSTNET barcode printed on near the bottom of the DAB. In addition, a flag that identifies the status of the DPC can be set and printed in the barcode. For example, if the DPC can be validated before being printed, the flag may be set and printed in the barcode to reflect that the indicium contains a validated DPC; if not and a DPC is printed, the flag would reflect that the indicium contains an un-validated DPC; and if not and a DPC is not printed, the flag would reflect that the indicium does not contain a DPC. As a result, using a mail piece dependent indicium will enable rapid and accurate determination of the destination address.

Alternatively, in another embodiment of the present invention, for letterhead that will appear through a clear window in the envelope, the DAB and the DPC barcode may be printed directly onto the letterhead in a position that will be visible through the window when the letterhead is correctly placed in the envelope.

Figure 1B:
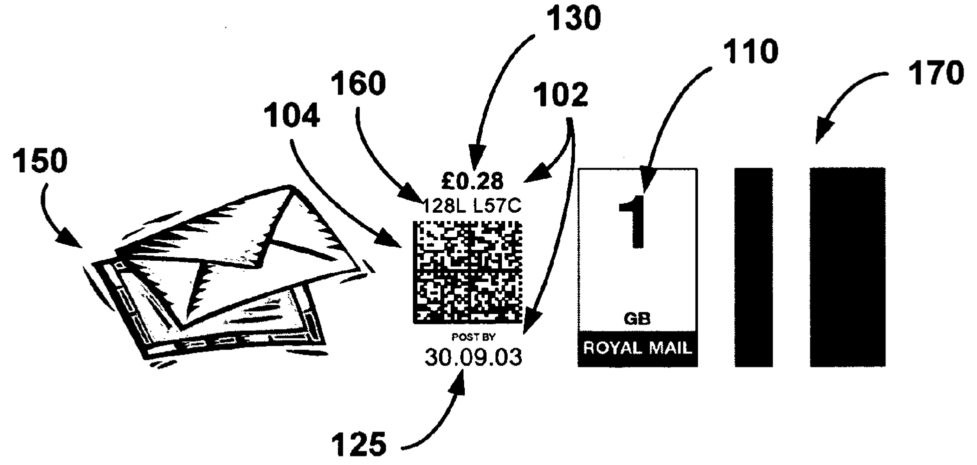
FIG. 1B is another example of a postal indicium containing both barcoded and human-readable information that may be used in accordance with other embodiments of the present invention.

FIG. 1B is another example of a postal indicium containing both barcoded and human-readable information that may be used in accordance with the same and other embodiments of the present invention. In FIG. 1B, similar elements to those described above in relation to FIG. 1A, are designated using the same reference numbers as in FIG. 1A. In FIG. 1B, the main differences from FIG. 1A is that the postal indicium in FIG. 1B does not include date of printing 120 and customer account number 140, but does include a post-by date 125, which may specify a date by which the postal indicium must be mailed, and a facing identification mark ("FIM") 170, which may be used to aid in machine sorting of the mail piece.

Figure 2:
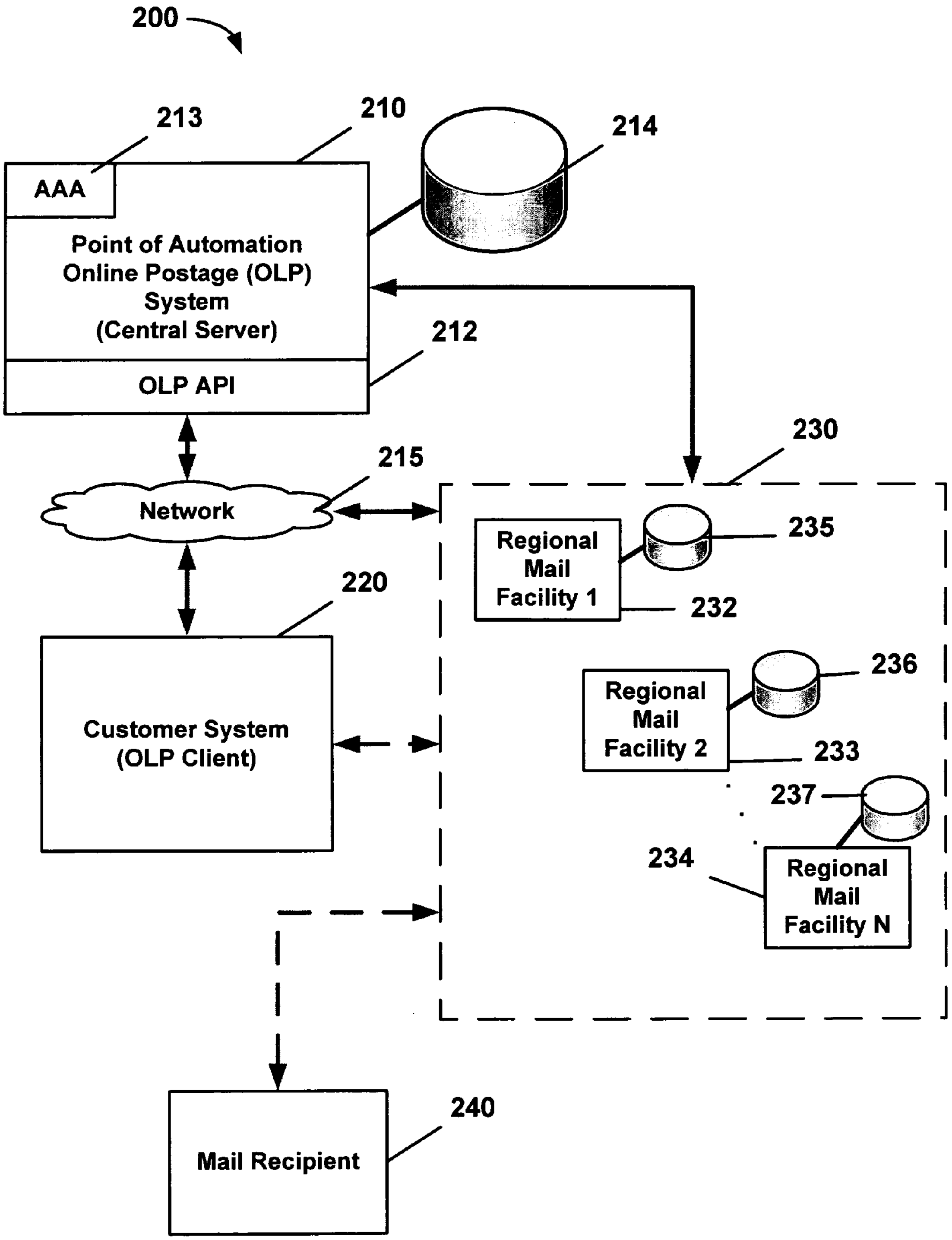
FIG. 2 is a block diagram of a system to print and verify postal indicia products, in accordance with an embodiment of the present invention.

FIG. 2 is a block diagram of a system to print and verify postal indicia products, in accordance with an embodiment of the present invention. In FIG. 2, a system 200 to print and verify postal indicia products may include a point of automation ("POA") 210, which may include an on-line postage ("OLP") system that may function as a central server for the rest of the system. POA 210 may further include an OLP application programming interface ("API") 212 to enable a customer system 220 to access the on-line postage system in POA 210, an automatic account adjustment ("AAA") system/subsystem 213 to perform additional revenue protection processing to adjust (e.g., credit and/or debit) a balance in a client account associated with customer system 220, and a central tag database 214 to store data on postal indicia printed by customer 220. AAA system/subsystem 213 may credit and/or debit the client account to adjust the balance due to reflect postage charges, maintenance and/or service fees, and/or fines. POA 210 may be implemented as a computer software program system that may be connected to customer system 220 through network 215 (for example, the Internet, a private wide or local area network, or another public or private network) to enable two-way communication between the two. The connection between POA 210 and customer system 220 also may be made using dedicated and/or undedicated direct communications lines/channels, for example, plain old telephone system ("POTS") lines, wireless channels, cable, etc. Similarly, customer system 220 may be implemented as a computer software program OLP client system. POA 210 also may be connected to a plurality of other POAs and to a group of regional mail sorting/handling facilities 230, which may include multiple regional mail facilities 232, 233, 234 with each having its own local tag database 235, 236, 237 and associated computer software program. The connection between POA 210 and each of multiple regional mail facilities 232, 233, 234 may be via dedicated and/or undedicated communication line/channels, as described above, as well as via network 215. POA 210 may be connected to each of multiple regional mail facilities 232, 233, 234 to enable two-way communication with each. Likewise, customer system 220 may be connectable to each of multiple regional mail facilities 232, 233, 234 to enable two-way communication through network 215 as shown in FIG. 2 or by another network or communication line/channels, as described above.

In addition, in FIG. 2, customer system 220 and group of regional mail sorting/handling facilities 230 also may have a physical communication path (shown by the dashed line) that provides for the delivery of a mail piece from a customer using customer system 220 to one facility in group of regional mail sorting/handling facilities 230. Group of regional mail sorting/handling facilities 230 also may be associated with a mail recipient 240, as shown by the dashed line, which indicates that, in general, the only communication between mail recipient 240 is via another physical communication path to deliver the mail piece from the customer. However, it is also possible that mail recipient 240 may have a customer system like customer system 220, which would permit two-way electronic communication between mail recipient 240 and POA system 210 and group of regional mail sorting/handling facilities 230.

In FIG. 2, in accordance with an embodiment of the present invention, POA 210 may include an online postage ("OLP") system that may be implemented using standard software programming techniques as a centralized server. POA 210 may permit a customer to use customer system 220 (for example, an OLP client) to set up and fund an account to print the as needed postal indicia upon request. For example, customer system 220 may be implemented using a browser that may interact with POA 210 through a web portal that may act as a front-end to POA 210. The web portal may include application server and data server functionality, which may be implemented in a single server or in separate servers (for example, an OLP application server and an OLP data server). Regardless of how implemented, the server(s) may contain all of the business logic and data of the OLP system, including:

- Interfaces to existing mail system customer databases and billing systems;
- OLP customer account set-up and management with secure login;
- An history database of OLP transactions for customer reports and auditing;
- A database of every OLP indicium used;
- Support for printing OLP indicia, which must be done while the customer system is connected to the OLP system; and
- Customer support features (e.g., on-line help, tutorials, FAQ, etc.).

In general, the POA 210 will have the ability to validate addresses provided to the POA 210 from customer system 220, either provided individually or in a customer mailing list. This will enable the POA 210 to embed a DPC in data sent with an authorization to customer system 220 where it may be printed in the indicium, for example, as described above in relation to barcode portion 104 of postal indicium 100 in FIG. 1.

Returning to FIG. 2, system 200 may include some automatic revenue protection ("ARP") measures to handle indicia suspected of being fraudulent, for example, indicia that are unreadable, expired, undervalued, forged, duplicated, and/or altered. An unreadable indicium is considered to be fraudulent for revenue protection purposes and, in general, will result in the mail piece to which the fraudulent indicium is affixed being removed from system 200. However, this is the least suspicious type of fraudulent indicium, since the indicium could be unreadable due to a smudge, a cancelled indicium, a bad camera or a failure in trying to determine the applicable postcode. In each of these cases, in general, no fraud has actually taken place, just an error in or with the indicium. Similarly, expired indicia are indicia that were place in the mail system and posted after the post-by date specified in the indicium. When a post-by date is used, the indicium must be posted within a configurable number of days before and after the post-by date or system 200, for example POA 210, will consider the indicium to be out-of-date and may cause the mail piece to be removed.

Continuing with the ARP measures, underpayment relates to, paying for and applying an indicium with an insufficient value to a mail piece (e.g., a letter), either by accident or intentionally. For example, this may occur when a customer requests, pays for and prints a $0.23 address independent indicium for a post card but puts the indicium on a regular First Class letter, which requires a $0.37 First Class indicium. After the letter is scanned, system 200, for example POA 210, may compare the information contained in the indicium and the actual type of letter to which the indicium is affixed with a rate/tariff table to determine whether the correct postage has been paid. If the correct postage has been paid, the letter may continue through system 200 and be sorted for delivery. If the correct postage has not been paid, the letter may be removed from system 200 and appropriate ARP measures may be initiated. In addition to being one of the most serious types of suspected fraud, underpayment also may be the most likely to occur in practice.

The next ARP measure involves forged indicia, which also is a serious type of suspected fraud, since it is an overt attempt to defraud the postal system. Unfortunately, modern graphics tools and printers and copiers have made it relatively easy to create a picture that looks like a valid indicium, but, in reality, is totally fictitious. Fortunately, protection from this type of fraud may be enabled by encrypting the data bytes in a datamatrix using a "secret key" to produce a security code that is specific to and printed in the indicium. System 200, for example POA 210, may include the security code and the identification of the secret key in the datamatrix. Accordingly, during the initial processing when at least the indicium is read from the datamatrix, system 200, for example POA 210, may obtain the security code, key identification, mail class, mail value, date of printing of the indicium, etc. The process that was used to encrypt the data bytes in the datamatrix using the secret key may be repeated using the information obtained from the datamatrix and the secret key, and the resulting security code may be compared against the original security code. If the new security code does not match the security code from the indicium's datamatrix, the mail piece may be considered to be fraudulent and removed from system 200. If the new security code does match, the mail piece may continue through system 200 and continue to be sorted for delivery.

Another ARP measure involves duplicate detection, which includes verification that valid indicia are only used once and not, for example, photo-copied onto and/or used on multiple different mail pieces. Duplicating indicia is another serious type of suspected fraud, since it is relatively easy to do and is also an affirmative attempt to defraud the postal system. In general, POA 210, may be enabled to detect duplicate indicia when it receives information scanned from each indicium already affixed to different mail pieces. POA 210 may detect a duplicate indicium by checking the received information against a master database in which is stored data on all indicia authorized to be and identified as being printed. The first time scanned indicium information is received, a flag in the database may be set to identify the indicium as having been cancelled, e.g., already used on a mail piece. Therefore, when subsequent scanned information on the same indicium is presented to the main database, it may be identified as a duplicate and the mail piece to which the indicium is attached may be considered to be fraudulent and removed from system 200. In addition, POA 210 may also notify each of multiple regional mail facilities 232, 233, 234 with information on the duplicate indicium.

The last ARP measure, detecting altered indicia, involves checking the indicium to verify that what the indicium "says" is the proper postage and/or class of service is what was actually purchased. This can occur when the customer alters the indicium to obtain a service that he did not purchase, for example, the customer may have changed the indicium value from $0.23 to $0.37 or more, or altered the branding mark to reflect a higher class of service than was actually paid. In general, protection against altered indicia occurs at POA 210 after it receives the scanned information from, for example, one of multiple regional mail facilities 232, 233, 234. Specifically, POA 210 may compare the scanned information against the data stored in database 214 that shows what services for which the customer actually paid. If the two do not match, POA 210 may send an "invalid indicium" flag and/or not sent a "valid indicium" flag with instructions on how to handle the mail piece to which the invalid indicium is affixed back to the regional mail facility that sent the scanned indicium information. Alternatively, this protection also may be implemented at each of multiple regional mail facilities 232, 233, 234.

Additionally, in FIG. 2, POA 210 and/or the regional mail facility also may compare the human-readable information with the machine-readable information on the mail piece to verify the indicium on the mail piece is correct, accurate and unaltered. To do this the human-readable portion of the indicium, generally, may be processed using OCR or some other image recognition techniques to convert the image of the human-readable portion to usable digital representations of each character. For example, processing the part of an image taken from the indicium of FIG. 1 containing "$0.37", would result in a digital value of 0.37 being created that may or may not also be formatted as currency. After the human-readable portion of the indicium is processed the results may be compared with the machine-readable portion of the indicium to identify any differences. If differences are identified, the mail piece may be considered to have a fraudulent indicium and the mail piece may be removed from the mail system. In addition, if differences are identified, the information may be sent to a reporting system, for example, a separate or integrated AAA system/subsystem 213, for revenue protection action(s) such as adjustments to the customer's account for insufficient and/or excess postage, fines and/or other penalties for printing and using fraudulent indicia, and/or service fees. An embodiment in which a separate AAA system/subsystem may be implemented is illustrated and described below in relation to FIG. 7.

In FIG. 2, AAA system/subsystem 213 may be implanted at either or both of POA 210 and each of multiple regional mail facilities 232, 233, 234. Regardless of where implemented, AAA system/subsystem 213 may operate to: read the postage amount in the barcode portion of an indicium; compare the read amount with a postal tariff/rate table for the mail piece to which the indicium is affixed; compare the read amount with a stored amount that was received from a source of the indicium (e.g., an OLP customer) after the source printed the indicium; and credit/debit an account associated with the source of the indicium at POA 210. In addition, a determination may be made as to whether any discrepancy between the indicium and the correct tariff/rate and/or the stored data would be suspected of being an attempt to defraud the postal system. If so, the AAA system/subsystem 213 may further debit the source's account to levy fines associated with the specific determination of fraud, and may include freezing further activity on the account. Totally separate from crediting/debiting the source's account to correct the amount of postage billed and/or fines levied, the AAA system/subsystem 213 may also periodically debit the source's account for service and maintenance fees associated with maintaining the account.

In general, in FIG. 2, if AAA system/subsystem 213 is also implemented at multiple regional mail facilities 232, 233, 234, it remains implemented at POA 210, which acts as a central server/repository of the overall account information. For example, POA 210 may push customer account information out to each of multiple regional mail facilities 232, 233, 234 to permit them to perform all of the ARP and AAA functions and then provide updated client account information back to POA 210. Likewise, multiple regional mail facilities 232, 233, 234 may only perform part of the ARP functions, for example, reading the postage amount from an indicium, comparing the read postage amount against the tariff/rate table for the mail piece to which the indicium is affixed, and sending a credit/debit message to POA 210 to have POA 210 perform the AAA functions to adjust the customer account according to an amount specified in the credit/debit message.

Likewise, in FIG. 2, specific human-readable service information (e.g., mail class, mail value, or special services requested such as signed-for delivery, return-receipt requested, etc.) may be verified against what was actually sold, as reported in the machine-readable portion of the indicium (i.e., the barcode). For example, if a mail piece is labeled with a human-readable indicator for "First Class" but the barcode for the mail piece indicates that the mail piece is "Second Class," the mail piece may be identified as possibly being fraudulent. Alternatively, the mail piece may be considered to be fraudulent, if the mail piece appears in the mail system as "First Class" as indicated in the human-readable portion of the indicium, but the payment made by the customer (e.g., the sender of the mail piece) as indicated in the barcode in the indicium for the mail piece is insufficient for that class of service.

In FIG. 2, in accordance with an embodiment of the present invention, after setting up and funding the account, POA 210 may receive a request from customer system 220 to authorize the customer system 220 to print an as needed amount of postage. POA 210 may check the account specified in the request to determine if it is a valid account and if there is enough credit in the account to pay for the requested, as needed amount of postage. If the account is valid and there is enough credit, POA 210 may send an authorization to customer system 220 to print the requested amount of postage and debit the customers account for the requested amount.

In FIG. 2, upon receiving the authorization to print the requested amount of postage, customer system 220 may immediately print an indicium, for example, an OLP postal indicium, in the requested amount. Customer system 220 may print the indicium directly on a mail piece or on another medium, for example, a label, that may be subsequently affixed to the mail piece. Customer system 220 may send data to POA 210 that details exactly what was printed in the indicium and POA 210 may store the data on what was actually printed in the indicium for later use to verify the indicium when it is in the mail system. The customer at customer system 220 may place the mail piece with the indicium affixed thereto into the mail system, which will ultimately result in one of multiple regional mail facilities 232, 233, 234 receiving the mail piece. In general, while this one regional mail facility will be the one that is the closest to the customer, it can be any of the regional mail facilities. A connection between customer system 220 and multiple regional mail facilities 232, 233, 234 may be effected via network 215 to enable two-way electronic communication between the two is possible, since elements of POA 210 may be implemented in multiple regional mail facilities 232, 233, 234. For example, some or all of the functionality of POA 210 may be implemented in one or all of multiple regional mail facilities 232, 233, 234 with which customer system 220 may need to communicate.

In FIG. 2, POA 210 and one of multiple regional mail facilities 232, 233, 234 may communicate when the mail piece with the printed indicium is received and scanned at one of multiple regional mail facilities 232, 233, 234, for example, a first regional mail facility 232. Specifically, first regional mail facility 232 may send the scanned indicium information to POA 210 for verification and validation of the indicium information. The scanned indicium information may or may not be deciphered, that is, translated into a digitally usable format, before it is sent to POA 210 from first regional mail facility 232. Regardless, POA 210 may decipher the indicium information, if necessary, and compare the scanned indicium information with the data on what was actually printed in the indicium that is stored at POA 210 to verify and validate the indicium. POA 210 may send instructions to first regional mail facility 232 that specify how to deal with the mail piece. For example, the instructions may tell first regional mail facility 232 to send the mail piece on to the next stage of processing in the mail system, if everything is verified and validated; add postage to the mail piece and then send the mail piece on to the next stage of processing in the mail system, if the postage was incorrect; and/or cull the mail piece from the mail system, if the indicium can not be verified and validated. First regional mail facility 232 may save information received from POA 210 on the validation of the postage directly in first total tag database 235, as well as the other local tag databases 236, 237 for subsequent use by regional mail facilities 232, 233, 234 to determine whether the indicium may be fraudulent and to save a processing history of the mail piece. In addition, POA 210 may send information to a reporting system to perform additional automatic revenue protection processing.

Alternatively, in FIG. 2, first regional mail facility 232 may validate the postage contained in the indicium and save information on the validation of the postage directly in the tag database.

Figure 3:
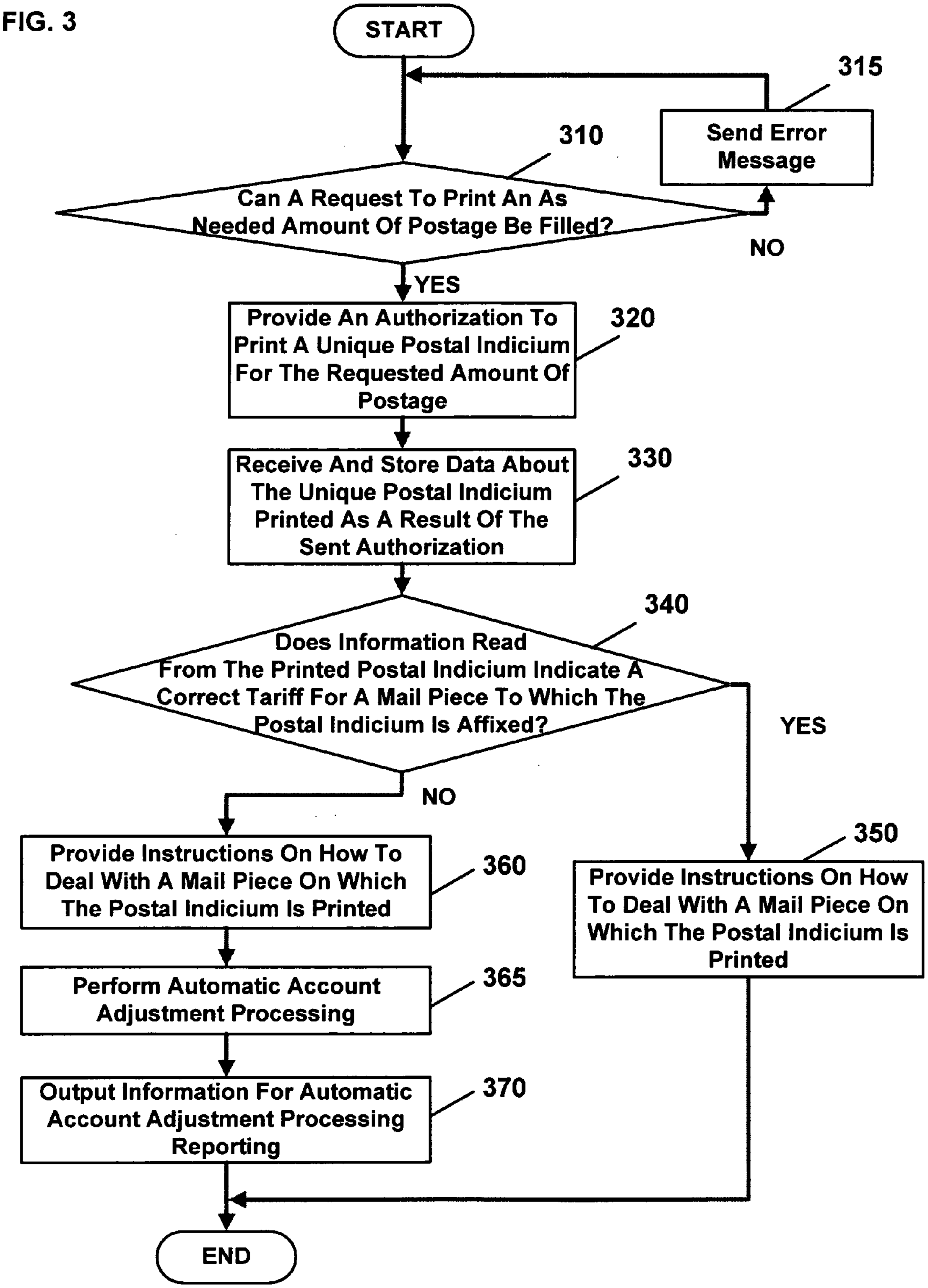
FIG. 3 is a flow diagram of a method for authorizing the printing and performing the verification of as needed postal indicia products, in accordance with an embodiment of the present invention.

FIG. 3 is a flow diagram of a method for authorizing the printing and performing the verification of as needed postal indicia products, in accordance with an embodiment of the present invention. In FIG. 3, a method 300, which, for example, may be implemented at POA 210 of FIG. 2, may include determining (310) whether a request to print an as need amount of postage from a customer system, for example, customer system 220 in FIG. 2, can be filled. The method in FIG. 3 may include sending (315) an error message back to customer system 220 to notify the customer that the request was denied and why the request was denied, and loop back to wait for another request, if it is determined (310) that the request can not be filled. Alternatively, rather than looping back to wait, the method may terminate. Conversely, if it is determined (310) that the request can be filled, the method may include providing (320) an authorization to customer system 220 to print the requested postage as a postal indicium for a mail piece and debiting an account associated with customer system 220. The method may further include receiving and storing (330) data about the postal indicium printed by customer system 220 in response to the provided (320) authorization. The method may still further include determining (340) whether the postal indicium indicates a correct tariff for a mail piece to which the postal indicium is affixed. The method may still further include providing (350) instructions on how to deal with the mail piece on which the indicium is printed, if it is determined (340) that the postal indicium does indicate the correct tariff for the mail piece to which the postal indicium is affixed and the method may end.

Alternatively, in FIG. 3, the method may include providing (360) instructions on how to deal with the mail piece on which the postal indicium is printed, if it is determined (340) that the postal indicium does not indicate the correct tariff for the mail piece to which the postal indicium is affixed. The method may also include performing automatic account adjustment processing to credit/debit the account associated with customer system 220. The method may further include outputting (370) information to an automatic account adjustment processing reporting system and the method may end.

In FIG. 3, in accordance with an embodiment of the present invention, the method may be implemented using machine-readable (e.g., computer) instructions stored on a machine-readable medium. For example, the machine-readable instructions may be implemented in a software program that may be executed by POA 210 to perform the method.

Although not shown in FIG. 3, the method may also include a one-time, preliminary setting up/creating and finding of a customer (i.e., a client) account that is associated with POA 210. This one-time setting up/creating and finding of the customer account may occur just before, concurrently with, and/or well in advance of the rest of the method.

In another embodiment of the present invention, only the verification aspects of the method of FIG. 3, may be performed (e.g., (330) through (370)) using data on a postal indicium received from and printed in a third-party system. Specifically, scanned information on the third-party postal indicium may be received at POA 210 to determine (340) whether the postal indicium indicates a correct tariff for a mail piece to which the postal indicium is affixed. The data may be received either prior or subsequent to receiving the scanned information on the postal indicium. In this embodiment, the separate POA in the third-party system may be considered to be the source of the postal indicium so that upon receipt of the data on the postal indicium, the closed-loop information system is completed.

Figure 4:
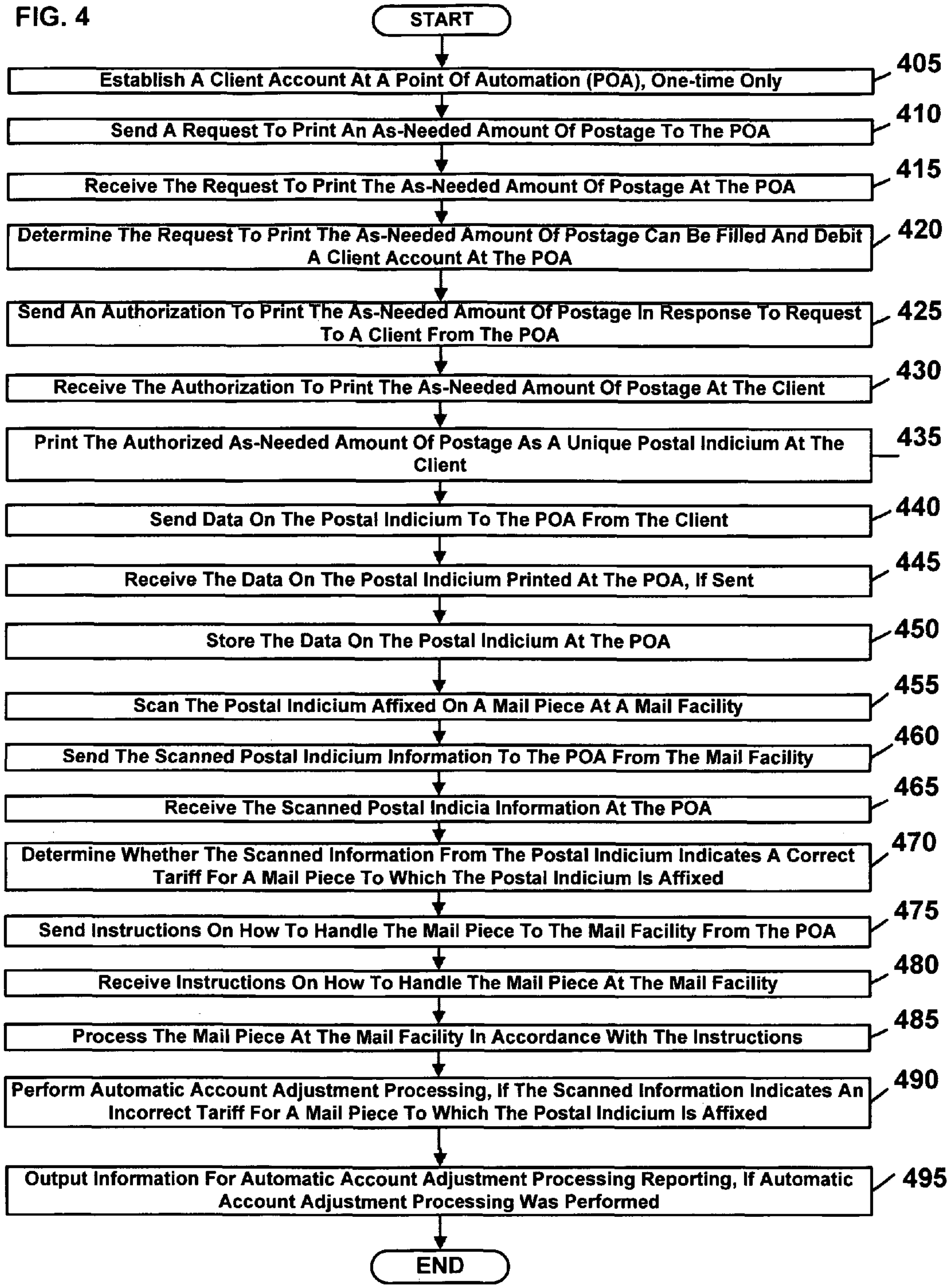
FIG. 4 is a flow diagram of an overall method for authorizing the printing of, printing, scanning, and performing the verification of as needed postal indicia products, in accordance with an embodiment of the present invention.

FIG. 4 is a flow diagram of an overall method for authorizing the printing of, printing, scanning, and performing the verification of as needed postal indicia products, in accordance with an embodiment of the present invention. In FIG. 4, as a one-time action for each client (i.e., customer), the method may include establishing (405) a client (i.e., a customer) account at POA 210 and providing a level of credit for the account. This one-time action is a preliminary action that may be done just before, concurrently with, and/or well in advance of the following parts of the method are performed. The method may also include, customer system 220 sending (410) a request to POA 210 to print an as-needed amount of postage. The method may further include POA 210 receiving (415) the request to print the as needed amount of postage, determining (420) that the request to print the as-needed amount of postage can be filled and debit the account associated with customer system 220 for the amount of the as-needed amount of postage. The method may further include POA 210 sending (425) an authorization to customer system 220 to print the requested as-needed amount of postage, customer system 220 receiving (430) the authorization to print the as-needed amount of postage from POA 210, and customer system 220 printing (435) the authorized as-needed amount of postage as one or more postal indicia. In general, the authorization may contain all of the necessary information, identifications and/or digital information/signatures that customer system 220 may need and use to print (435) the indicia, and customer system 220 does not permanently store the authorization and/or any information associated therewith. In fact, customer system 220 generally prints (435) the indicia for the as-needed amount postage as soon as possible, e.g., immediately after receiving (415) the authorization to print the as-needed amount of postage. The printing (435) of each indicium may occur in several ways, including directly on a mail piece (e.g., an envelope, postcard, etc.), on a separate label to be applied to the mail piece, and/or an insert (e.g., letterhead, card, etc.) that may be inserted into a mail piece to be viewed through a window in the mail piece. Once the indicium is affixed to the mail piece, it may be placed in the mail system by the customer and eventually be received at a mail facility, for example, one of multiple regional mail facilities 233, 234, 235 in FIG. 2, for sorting and processing.

In FIG. 4, the method may also include customer system 220, optionally, sending (440) data on the postal indicium to POA 210 and, if sent (440), POA 210 receiving (445) and storing (450) the data on the postal indicium printed (435) to represent the as-needed amount of postage. The method may further include scanning (455) the postal indicium affixed to the mail piece as well as other information on the mail piece (e.g., destination address block, etc.) at a mail facility that receives the mail piece and sending (460) information on the indicium obtained from the scan (455) to POA 210. The method may still further include POA 210 receiving (465) the scanned indicium information and determining (470) whether the scanned information from the postal indicium matches the stored (450) data, is a duplicate, and/or otherwise suspect fraudulent. In the method, determining (470) whether the scanned (455) information matches the stored (450) data may include POA 210 deciphering the scanned (455) information and comparing the deciphered information with the stored (450) data to determine (470) whether the scanned (455) information matches the stored (450) data.

In FIG. 4, the method may further include POA 210 sending (475) instructions to the mail facility on how to handle the mail piece to which the indicium is attached, similar to those described above in relation to FIG. 2. In FIG. 4, the method may still further include the mail facility receiving (480) the instructions on how to handle the mail piece sent (475) from POA 210 and handling (485) (i.e., processing) the mail piece to which the indicium is attached in accordance with the instructions received (480) from POA 210. The method may still further include performing (490) AAA processing and outputting (495) information to report on results of the AAA processing performed (490), for example, adjustment of the customer's account balance to charge and/or credit additional postage, fees and/or fines, if the scanned information is determined (470) not to match the stored (455) data and the method may terminate. For example, additional postage may be charged to the customer's account and an instruction to "add" the additional postage to the mail piece may be sent to the mail facility, if POA 210 detects an insufficient amount of postage on the mail piece. Conversely, excess postage may be credited to the customer's account and an instruction to "subtract" the excess postage may or may not be sent to the mail facility, if POA 210 detects an excess amount of postage on the mail piece. POA 210 may also automatically charge service and/or other fees to the customer's account as well as fines that may be associated with indicia that are determined by the mail system as being fraudulent or as being suspected of being fraudulent.

In accordance with another embodiment of the method of the present invention, in FIG. 4, the mail facility may store a copy of the stored data from POA 210 and the mail facility may determine that the scanned information matches the stored data at the mail facility. Similar to the method in FIG. 4, in this embodiment, rather than POA 210 doing all of the deciphering of the scanned information, the mail facility may decipher the scanned information and compare the deciphered information with the stored data to determine that the scanned information matches the stored data at the mail facility. Therefore, the mail facility may supply for its own use, the necessary instructions on how to handle the mail piece with the indicium, similar to that described above.

In FIG. 4, in accordance with an embodiment of the present invention, the method may be implemented using machine-readable (e.g., computer) instructions stored on several different machine-readable medium. For example, the machine-readable instructions may be implemented in separate software programs that may be separately executed by POA 210, customer system 220, and each of regional mail facilities 232, 233, 234 to perform the overall method.

Figure 5:
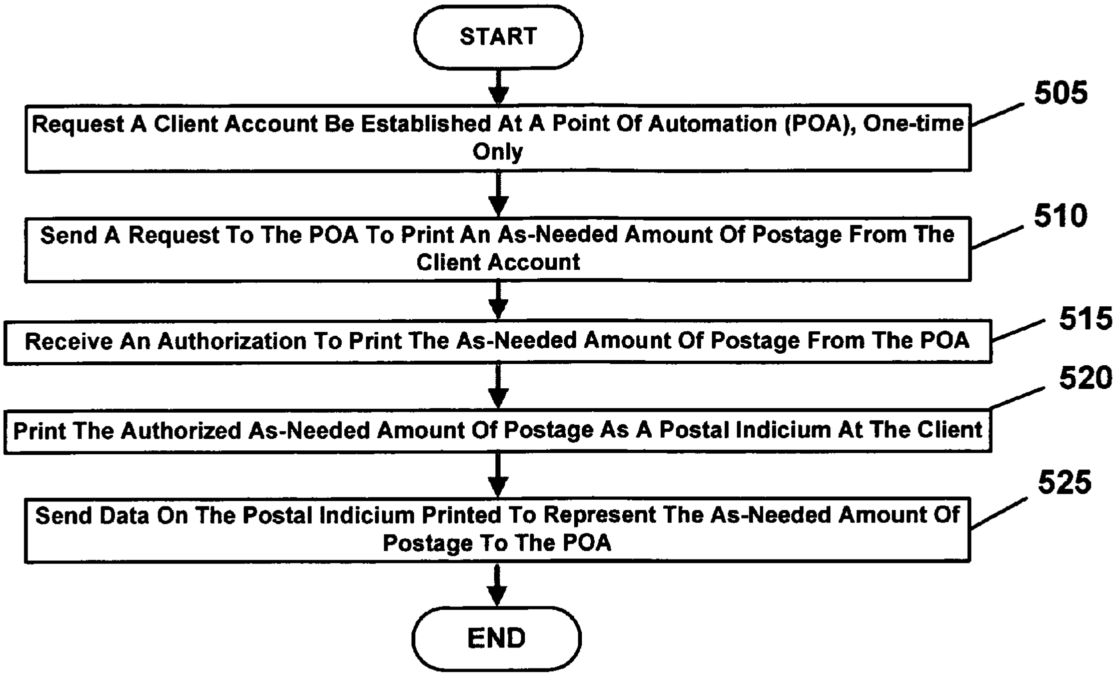
FIG. 5 is a flow diagram of a method of printing postal indicia products on an as needed basis, in accordance with an embodiment of the present invention.

FIG. 5 is a flow diagram of a method of printing postal indicia products on an as needed basis that may be performed by a customer system, in accordance with an embodiment of the present invention. In FIG. 5, as a one-time action for each client (i.e., customer) system 220, the method may include requesting (505) that a client (i.e., customer) account with a level of credit be established at POA 210. This one-time action is a preliminary action that may be done just before, concurrently with, and/or well in advance of the following parts of the method are performed. The method may include client system 220 sending (510) a request to POA 210 to print an as-needed amount of postage. The method may also include client system 220 receiving (515) an authorization to print the as-needed amount of postage as a postal indicium from POA 210. The method may further include client system 220 printing (520) the authorized as-needed amount of postage as a postal indicium and client system 220 sending (525) to POA 210 data on what was actually printed as the postal indicium by client system 220 and the method may terminate.

In FIG. 5, in accordance with an embodiment of the present invention, the method may be implemented using machine-readable (e.g., computer) instructions stored on a machine-readable medium. For example, the machine-readable instructions may be implemented in a software program that may be executed by customer system 220 to perform the method.

Figure 6:
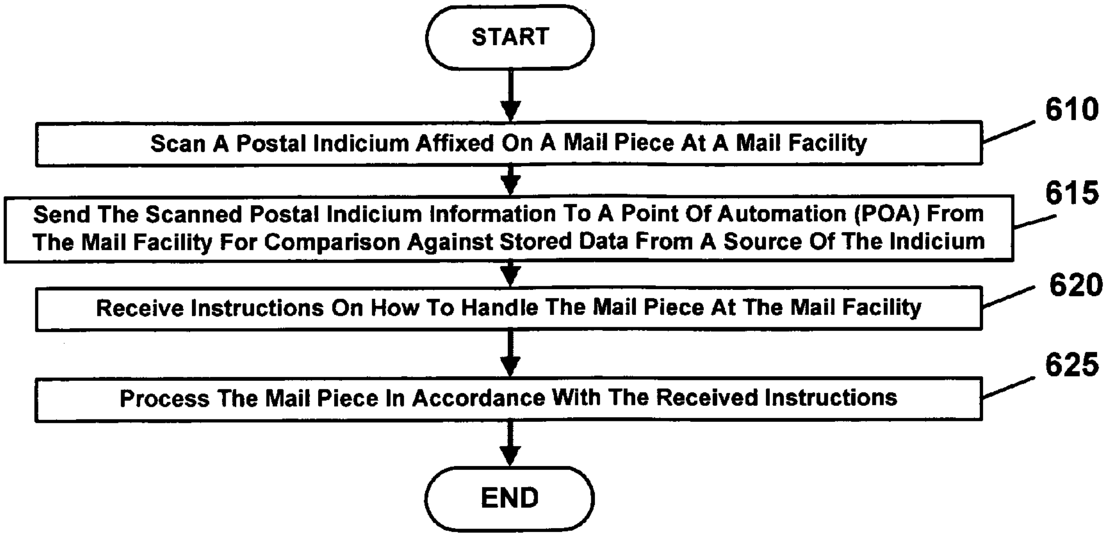
FIG. 6 is a flow diagram of a method of scanning and verifying postal indicia products, in accordance with an embodiment of the present invention.

FIG. 6 is a flow diagram of a method of scanning and verifying postal indicia products, in accordance with an embodiment of the present invention. The method may include scanning (610) a postal indicium affixed to the mail piece as well as other information on the mail piece (e.g., destination address block, etc.) at a mail facility that receives the mail piece and sending (615) information on the indicium obtained from the scan (610) to POA 210 to be deciphered and compared to the stored data on the indicium. Alternatively, as described above in relation to FIG. 4, the scanned (610) information may remain at the mail facility to be deciphered and compared to the stored data on the indicium. In FIG. 4, the method may further include the mail facility receiving (620) instructions on how to handle the mail piece either from POA 210 or the mail facility and handling (625) (e.g., processing)

the mail piece to which the indicium is attached, in accordance with the received instructions, and the method may terminate.

Figure 7:
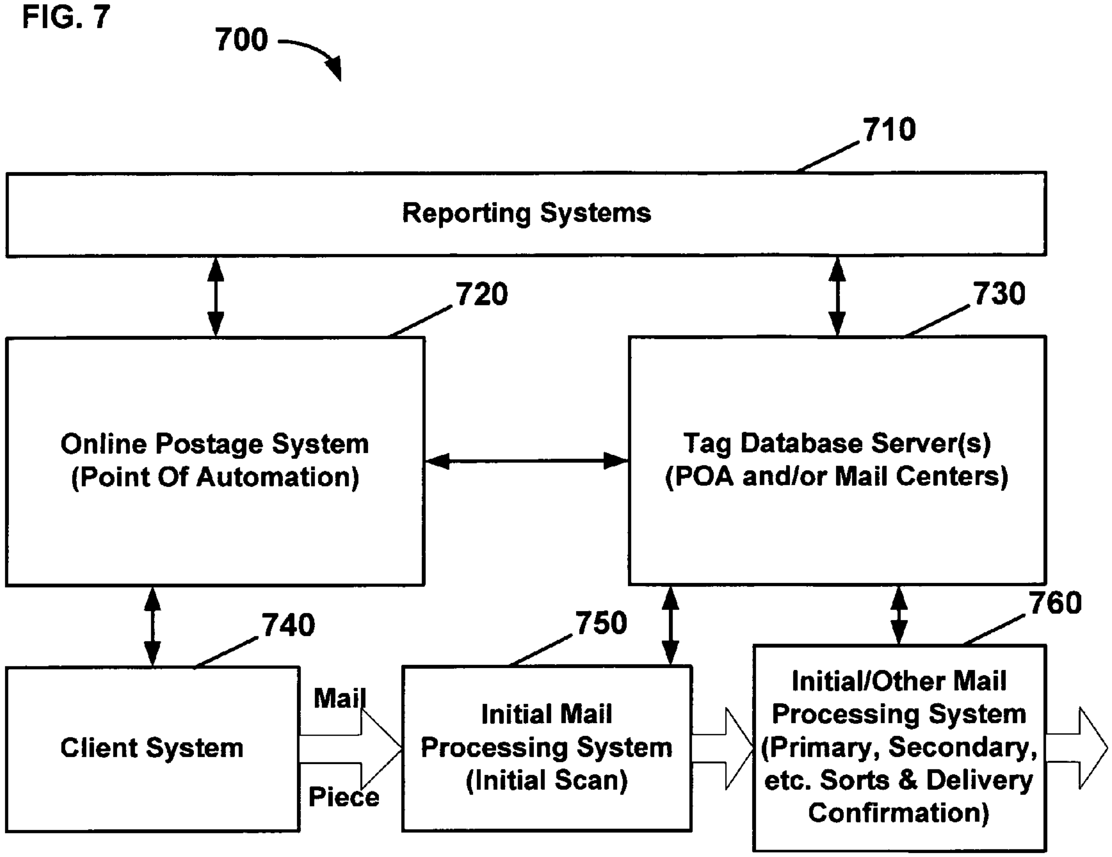
FIG. 7 is a block diagram of a system to print and verify postal indicia products, in accordance with another embodiment of the present invention.

FIG. 7 is a block diagram of a system illustrating a closed-loop of information flow used to print and verify postal indicia products, in accordance with another embodiment of the present invention. In FIG. 7, a closed-loop system 700 may include one or more reporting systems 710 in two-way communication with an OLP system (i.e., a POA) 720 and one or more tag database servers 730, which may be located at OLP system 720 and/or one or more regional mail processing facilities. One or more reporting systems 710 may include an AAA system/subsystem that may perform functions similar to those described above for AAA 213 in FIG. 2. Returning to FIG. 7, OLP system 720 also may be in two-way communication with each tag database server 730 and a client system 740. Tag database server 730 may also be in two-way communication with an initial mail processing system 750 and an initial/other mail processing system 760 located at one or more of regional mail processing facilities 232, 233, 234 of FIG. 2. Although, in FIG. 7, only one client system 740 is shown for ease of illustration, multiple client systems may actually be in two-way communication with OLP system 720.

At client system 740 a mail piece may be prepared for mailing, a request to print an as-needed amount of postage for the mail piece may be sent to OLP system 720, and an authorization may be received back from OLP system 720 to print the as-needed amount of postage as an indicium either directly on an exterior of the mail piece (e.g., on the outside of an envelope) or on a label that may be applied to the exterior of the mail piece. In addition, at OLP system 720 the amount the postage authorized to be printed may be deducted from a client account maintained at OLP system 720 and associated with client system 740. At client system 740 an indicium may be printed to represent the as-needed amount of postage, the indicium may be affixed to the mail piece, a message containing data describing the content (e.g., value, class of service, etc.) may be sent to OLP system 720, and the mail piece may be deposited in the mail system (e.g., mailed by a client from customer system 740).

In FIG. 7, after the mail piece enters the mail system, it may be received at an initial mail processing facility (e.g., a regional mail processing facility) where a single-pass image of the information (e.g., indicium, destination address block, return address, etc.) on the mail piece may be taken using an initial mail processing system 750. At the initial mail processing facility the indicium affixed to the mail piece may be validated and canceled either by mail processing system 750 or by being sent to OLP system 720 from initial mail processing system 750, and the scanned indicium and other mail piece information may be saved at one or more of tag database server(s) 730. In addition to the initial processing the mail piece may, generally, undergo at least one level of sorting by initial mail processing system 750 and be forwarded on for subsequent sorting and/or delivery confirmation. The subsequent sorting may be performed by initial mail processing system 750 or by another mail processing system 760. If the subsequent sorting is performed by another mail processing system 760, the mail piece first must be transferred to another mail processing system 760. Regardless of where the subsequent sorts and/or delivery confirmation may occur, the indicium on the mail piece may be detected, whether the indicium has been noted as cancelled in the database(s) may be determined, the processing that occurs to the mail piece may be saved in the database(s), instructions on how to handle the mail piece may be received, and the mail piece may be handled according to the received instructions (e.g., deliver the mail piece to an addressee in the destination address block, cull (i.e., remove) the mail piece from the mail system if the indicium is suspected of being fraudulent, etc.).

Figure 8:
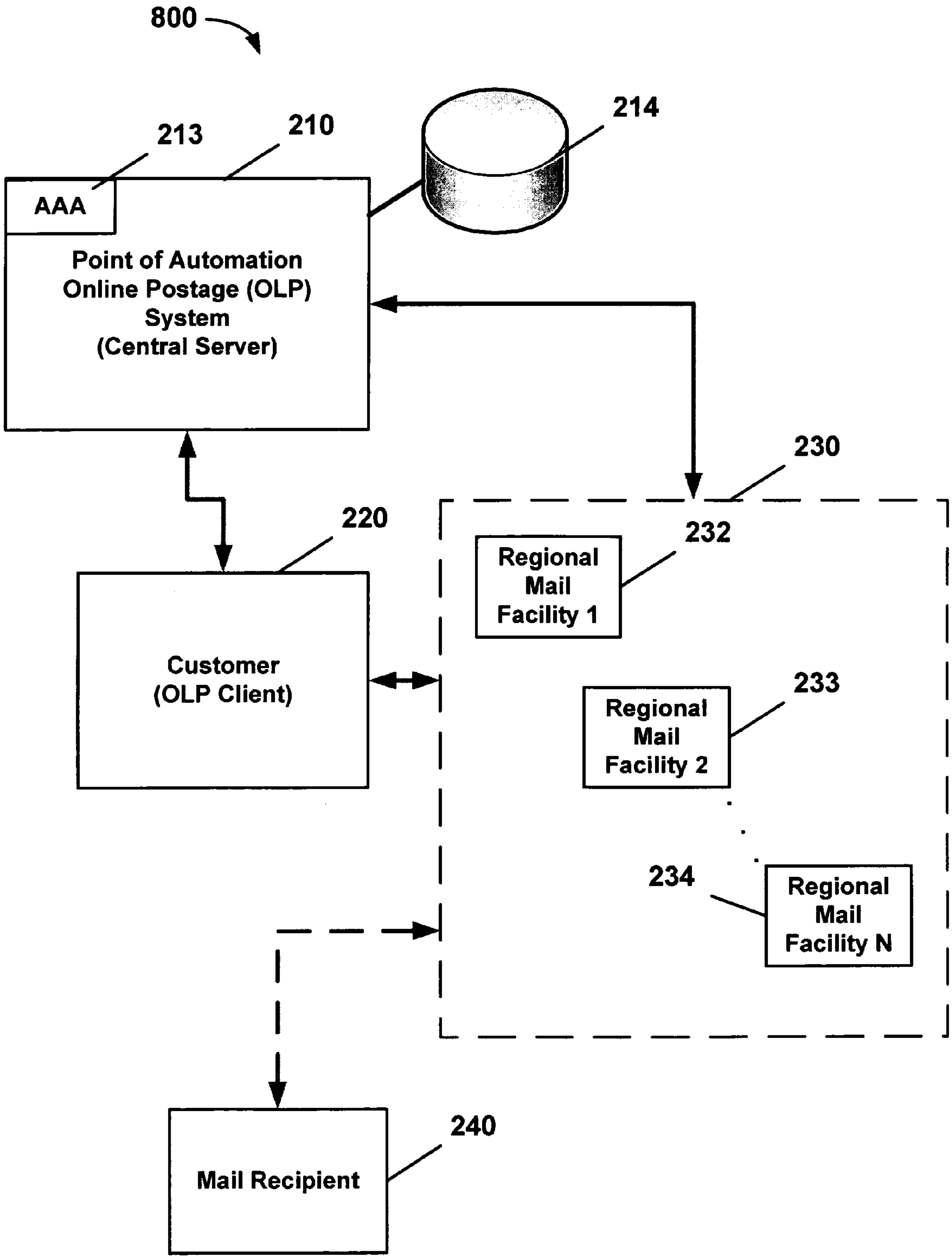
FIG. 8 is a block diagram of another system to print and verify postal indicia products, in accordance with another embodiment of the present invention.

FIG. 8 is a block diagram of another system to print and verify postal indicia products, in accordance with another embodiment of the present invention. In FIG. 8 the same reference numbers used in FIG. 2 are again used in FIG. 8 for like elements. In FIG. 8, a system 800 may print and verify postal indicia products and may include POA 210, which may include the OLP system. In the present embodiment, POA 210 may function as the central server to act as the sole repository of data and other information necessary for the rest of the system. POA 210 may be configured to enable customer system 220 to directly access the OLP system in POA 210 over dedicated and/or undedicated access channels, for example, plain old telephone system ("POTS") lines, wireless channels, cable, etc.

In FIG. 8, POA 210 may include AAA system/subsystem 213 and be coupled to tag database 214, which may store data received on postal indicia printed by customer 220 and POA 210 may be implemented as a computer software program and be connected to customer system 220 to enable two-way communication between the two. Similarly, customer system 220 may be implemented as a computer software program OLP client system. In this embodiment, multiple regional mail facilities 232, 233, 234 may not be able to perform any of the AAA functions and may only be able to perform the basic ARP functions, such as, for example, comparing the postage read from an indicium with a tariff/rate table and sending a message to POA 210 to credit/debit a customer account at POA 210. POA 210 also may be connected to group of regional mail sorting/handling facilities 230, which may include multiple regional mail facilities 232, 233, 234. The connection between POA 210 and each of multiple regional mail facilities 232, 233, 234 may be via dedicated and/or undedicated communication line(s). POA 210 also may be connected to each of multiple regional mail facilities 232, 233, 234 via the dedicated and/or undedicated communication line(s) to enable two-way communication with each. Likewise, customer system 220 may be connected to each of multiple regional mail facilities 232, 233, 234 to enable two-way communication through similar communication line(s) to those described above.

In addition, as in FIG. 2, in FIG. 8, customer system 220 and group of regional mail sorting/handling facilities 230 may also have a physical communication path (not shown) that provides for the delivery of a mail piece from a customer using customer system 220 to an initial one of group of regional mail sorting/handling facilities 230. Group of regional mail sorting/handling facilities 230 is also shown to be associated with a mail recipient 240 by a dashed line to indicate that, in general, the only communication between mail recipient 240 is via another physical communication path to deliver the mail piece from the customer. However, it is also possible that mail recipient 240 may have a customer system like customer system 220, which would permit two-way electronic communication between mail recipient 240 and POA system 210 and group of regional mail sorting/handling facilities 230. In reality, customer system 220 may only be in communication with only a single one of multiple regional mail facilities 232, 233, 234 and, in general, the one regional facility that is the closest facility to customer system 220.

In FIG. 8, in accordance with this embodiment of the present invention, POA 210 may include the OLP system and POA 210 may permit a customer to use customer system 220 (for example, an OLP client) to set up and fund an account to be used to pay for printing the as-needed postal indicia upon request. For example, customer system 220 may interact with POA 210 using a graphical user interface ("GUI") or some other user interface. POA 210 may provide application server and data server functionality and may be implemented in a single server or in separate servers (for example, an OLP application server and an OLP data server). Regardless of how implemented, the server(s) may contain all of the business logic and data of the OLP system as described above in relation to FIG. 2. Returning to FIG. 8, system 200 also may include similar ARP measures as discussed above in relation to FIG. 2.

It is, therefore, apparent that there is provided in accordance with the present invention, methods and systems for authorizing the printing, printing, scanning, and verifying postal indicia. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A method comprising:

at a first location, optically scanning a unique postal indicium printed by a sender and affixed to a mail piece to obtain an image of a human readable portion and an image of a machine readable portion of the unique postal indicium;

automatically decoding the image of the machine readable portion to obtain a value corresponding to a data record associated with the unique postal indicium and to determine whether the unique postal indicium is a mail piece dependent indicium, and, when the indicium is mail piece dependent, reading a flag in the machine readable portion indicating whether a delivery point code on the mail piece has been validated prior to being printed on the mail piece, and handling the mail piece responsive to the determining and reading;

using the value to retrieve the data record from a database disposed at the first location;

automatically recognizing alphanumeric characters in the image of the human readable portion;

comparing the recognized alphanumeric characters with retrieved information from a portion of the retrieved data record to determine whether the retrieved information matches the recognized alphanumeric characters;

calculating a class of service based on an amount paid for the unique postal indicium, type of mail piece, and a rate table;

performing automatic account adjustment processing on an account associated with a source of the unique postal indicium, when a result of the comparing indicates an incorrect tariff associated with the mail piece, the account adjustment processing including adjusting an account associated with a source of the unique postal indicium based on the result of the comparing, and updating account information at a point of automation in a second location geographically different from the first location with a result of the comparison, the automatic account adjustment processing occurring periodically at predetermined intervals of time; and outputting information to report results of the automatic account adjustment processing.

2. The method of claim 1, wherein the performing automatic account adjustment on the account associated with the source of the unique postal indicium comprises:

subtracting an amount equal to a deficiency in the incorrect tariff, from a balance amount in the account associated with the source of the unique postal indicium.

3. The method of claim 1, further comprising:

comparing the recognized alphanumeric characters against the rate table for the mail piece; and adjusting the account based on results of the comparison, if the recognized alphanumeric characters do not match the rate table.

4. The method of claim 1, wherein the performing automatic account adjustment processing on the account comprises:

adjusting the account to reflect payment of a periodic maintenance fee.

5. The method of claim 1, wherein performing automatic account adjustment processing on the account comprises:

adjusting the account to reflect payment of a fine.

6. The method of claim 1, wherein the outputting information to report results of the automatic account adjustment processing comprises:

outputting the information to a reporting system.

7. The method of claim 1, wherein an amount that the account is adjusted is a difference between a correct tariff for delivery of the mail piece and the incorrect tariff.

8. A nontransitory machine-readable medium having stored thereon executable instructions for performing a method comprising:

receiving optically scanned information from an optical scan of a unique postal indicium affixed to a mail piece, the optically scanned information including an image of a human readable portion and an image of a machine readable portion different than the human readable portion;

automatically decoding the image of the machine readable portion to obtain a value corresponding to a data record associated with the unique postal indicium;

reading a flag in the machine readable portion indicating whether a delivery point code on the mail piece has been validated prior to being printed on the mail piece, and handling the mail piece responsive to the reading;

using the value to retrieve the data record from a database;

automatically recognizing alphanumeric characters in the image of the human readable portion;

comparing the recognized alphanumeric characters with retrieved information from a portion of the retrieved data record to obtain a comparison result;

performing automatic account adjustment processing on an account associated with a source of the unique postal indicium, when the comparison result indicates an incorrect tariff associated with a mail piece to which the unique postal indicium is affixed, the account adjust processing including adjusting an account associated with a source of the unique postal indicium based on the result of the comparing; and outputting information to report results of the automatic account adjustment processing.

9. The machine-readable medium of claim 8, wherein the performing automatic account adjustment on the account associated with the source of the unique postal indicium comprises:

subtracting an amount equal to an as needed amount of postage printed in the unique postal indicium from a balance amount in the account associated with the source of the unique postal indicium.

10. The machine-readable medium of claim 9, further comprising:

comparing the optically scanned information representing the machine readable portion against a rate table for the mail piece; and adjusting the account based on results of the comparison, if the recognized alphanumeric characters do not match the rate table.

11. The machine-readable medium of claim 8, wherein the performing automatic account adjustment processing on the account comprises:

adjusting the account to reflect payment of a periodic maintenance fee.

12. The machine-readable medium of claim 8, wherein performing automatic account adjustment processing on the account comprises:

adjusting the account to reflect payment of fine.

13. The machine-readable medium of claim 8, wherein the outputting information to report results of the automatic account adjustment processing comprises:

outputting the information to a reporting system.

14. The method of claim 1, wherein the machine readable portion is a bar code.

15. The machine-readable medium of claim 8, wherein the machine readable portion is a bar code.

* * * * *